(12) United States Patent
Kovacs

(10) Patent No.: US 6,663,123 B1
(45) Date of Patent: Dec. 16, 2003

(54) PANEL MOVER

(76) Inventor: Stafford T. Kovacs, 808 W. Central, Roselle, IL (US) 60172

( * ) Notice: Subject to any disclaimer, the term of this patent is extended or adjusted under 35 U.S.C. 154(b) by 0 days.

(21) Appl. No.: 10/127,394

(22) Filed: Apr. 22, 2002

Related U.S. Application Data

(63) Continuation of application No. 09/435,881, filed on Nov. 8, 1999, which is a continuation-in-part of application No. 08/832,048, filed on Apr. 2, 1997, now abandoned.

(51) Int. Cl.⁷ .................................................. B62B 1/00
(52) U.S. Cl. ............................... 280/79.7; 280/47.131; 414/11; 269/133; 269/905
(58) Field of Search .................. 280/47.17, 47.131, 280/79.7, 431, 47.33; 414/444, 450, 10, 11; 269/17, 133, 905, 909, 254 R, 254 MW, 260, 237

(56) References Cited

U.S. PATENT DOCUMENTS

| | | | | |
|---|---|---|---|---|
| 1,103,486 A | * | 7/1914 | Cobb | 280/47.131 |
| 2,621,687 A | * | 12/1952 | Fordon | 269/133 |
| 2,971,548 A | * | 2/1961 | House | 269/133 |
| 3,653,135 A | * | 4/1972 | Jones | 38/135 |
| 3,717,357 A | * | 2/1973 | Schaefer | 280/47.131 |
| 4,270,741 A | * | 6/1981 | Hurst | 280/79.7 |
| 4,666,184 A | * | 5/1987 | Garvey, Jr. | 280/47.131 |
| 4,695,067 A | * | 9/1987 | Willey | 280/47.131 |
| 5,294,099 A | * | 3/1994 | Dalfino | 269/133 |
| 5,899,650 A | * | 5/1999 | Collins | 280/47.131 |

FOREIGN PATENT DOCUMENTS

SE          134 082        * 12/1951

* cited by examiner

*Primary Examiner*—Brian J. Johnson
*Assistant Examiner*—Christopher Bottorff
(74) *Attorney, Agent, or Firm*—Thomas R. Vigil; Welsh & Katz, Ltd.

(57) ABSTRACT

The panel mover is designed for receiving, holding and moving a panel and comprises: first and second elongate arms each having an upper end and a lower end and each having a length of between approximately 2 feet and approximately 4 feet; panel support structure connected between the arms; a wheel mounted to each arm on a wheel shaft extending from an outer side of each arm at the lower end of each arm; and, inwardly facing engaging structure only at the upper end of each arm for engaging the side surface of a panel positioned between the anns, whereby, when, an elongate edge of a panel is placed on the panel support stricture, the weight of the panel will cause each elongate arm to rotate upwardly around one of the wheel shafts and pivot inwardly toward the panel to a panel engaging position where the engaging structure at the upper end of each arm engages the panel.

12 Claims, 5 Drawing Sheets

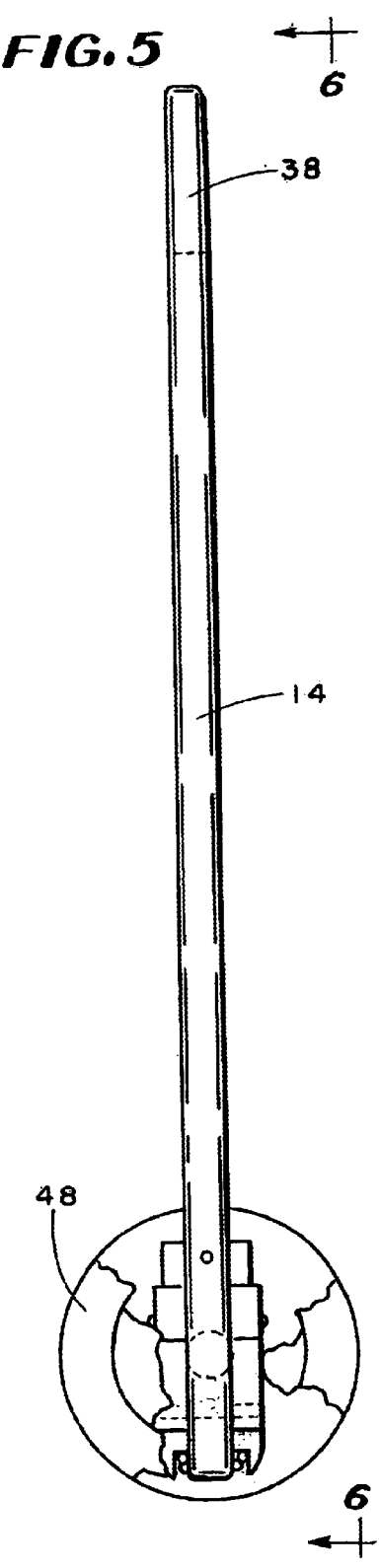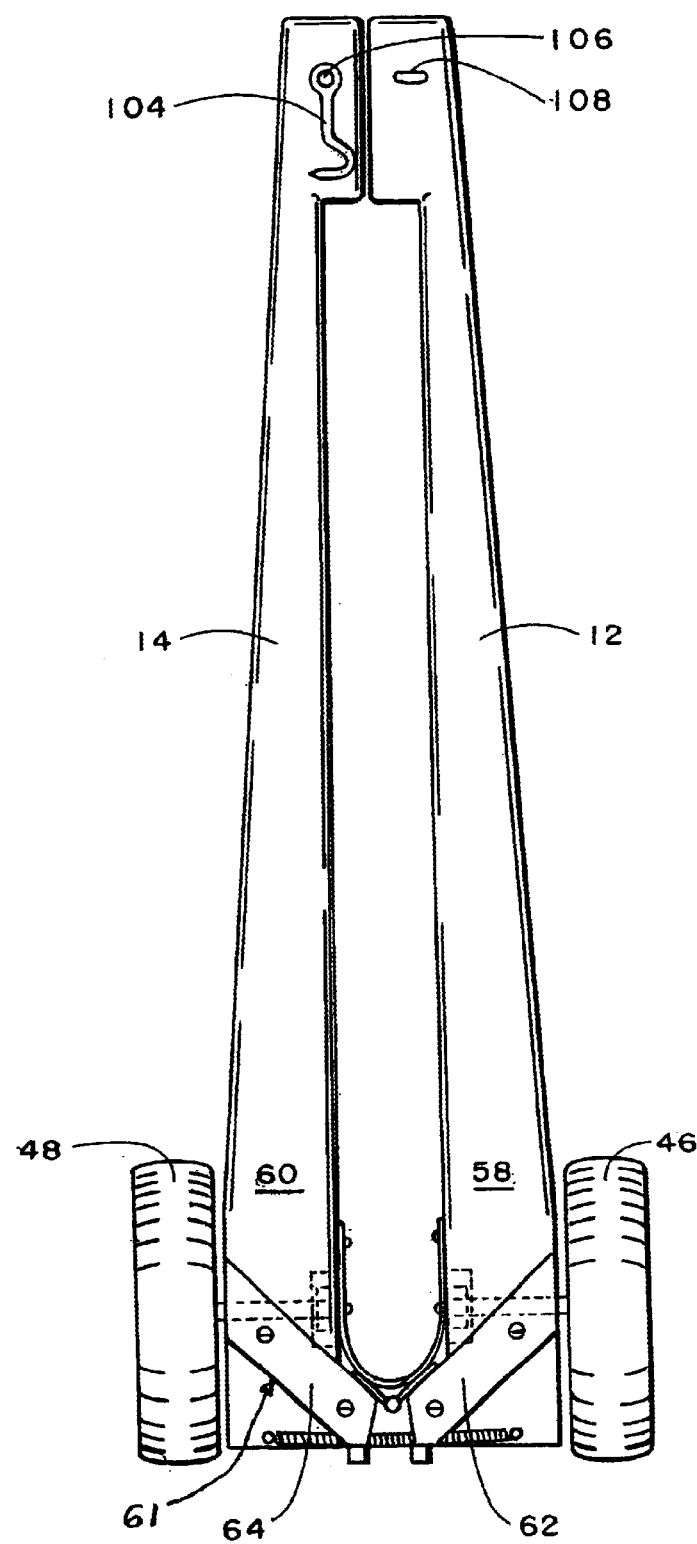

PANEL MOVER

This is a continuation of application Ser. No. 09/435,881, filed Nov. 8, 1999, which is a continuation-in-part of application Ser. No. 08/832,048, filed Apr. 2, 1997, now abandoned.

BACKGROUND OF THE INVENTION

1. Field of the Invention

The present invention relates to a panel mover or dolly for simply and efficiently holding a generally planer panel, such as a 4×8 or 4×12 sheet of drywall or a sheet of 4×8 or 5×12 sheet of plywood, in a manner that permits one person to move the dolly and panel from one location to another location. More specifically, the present invention relates to a panel movercomprising first and second upstanding arms which are pivotally connected to each other at the lower ends of the arm and with each arm mounting a wheel on an outer lower side thereof. A panel is positioned between the arms and rests on the pivot or hinge connection or on a strap or webbing fixed to and extending between the two arms. The weight of the panel moves the upper ends of the arms toward each other such that the upper ends of the arms grip and hold the panel on the panel mover or dolly while the panel mover and panel are moved from one location to another location.

2. Description of the related art including information disclosed under 37 CFR §§1.97–1.99.

Heretofore, various movers or dollys or vises for planar members, such as panels or sailboards, have been proposed.

Several examples of such analogous and non-analogcus dollys or panel moving devices are disclosed in the following analogous and non-analogous U.S. Patents:

| U.S. Pat. No. | Patentee |
| --- | --- |
| 3,877,582 | Moore |
| 4,270,741 | Hurst |
| 4,602,802 | Morgan |
| 5,226,656 | Mayer |
| 5,294,099 | Dalfino |
| 5,348,327 | Gieske |

The Hurst U.S. Pat. No. 4,270,741 discloses a short editor vise comprising a pair of jaws hinged together by spring loaded hinge. Each jaw includes an outer plate mounting a wheel on a shaft and an inner, door griping plate fixed to a threaded rod threadably mounted in the outer plate.

The Morgan U.S. Pat. No. 4,602,802 discloses a dolly inc luding a U-shaped portion having upright members for receiving a sailboard therebetween. An elastic strap extends across the top of the upright members of the dolly and the dolly has a pair of wheels for supporting the end of the board received in the U-shaped portion.

The Dalfino U.S. Pat. No. 5,294,099 discloses a holder assembly for clenching a door in an upright position including elongate, generally rectangular clamping members and no wheels.

SUMMARY OF THE INVENTION

According to the present invention there is provided a panel mover for receiving, holding and moving a panel. The panel mover comprises: first and second elongate arms each having an upper end and a lower end and each having a length of between approximately 2 feet and approximately 4 feet; panel support structure connected between the arms; a wheel mounted to each arm on a wheel shaft extending from an outer side of each arm at the lower end of each arm; and inwardly facing engaging structure only at the upper end of each arm for engaging the side surface of a panel positioned between the arms, whereby, when an elongate edge of a panel is placed on the panel support structure, the weight of the panel will cause each elongate arm to rotate upwardly around one of the wheel shafts and pivot inwardly toward the panel to a panel engaging position where the engaging structure at the upper end of each arm engages the panel.

BRIEF DESCRIPTION OF THE DRAWINGS

FIG. 5 is a side elevational view of the panel mover with portions broken away and is taken along line 5—5 of FIG. 2.

FIG. 6 is a back elevational view of the panel mover, similar to the view shown in FIG. 1, and is taken along line 6—6 of FIG. 5 and shows the arins unlatched.

DESCRIPTION OF THE PREFERRED EMBODIMENT(S)

Figure 1:
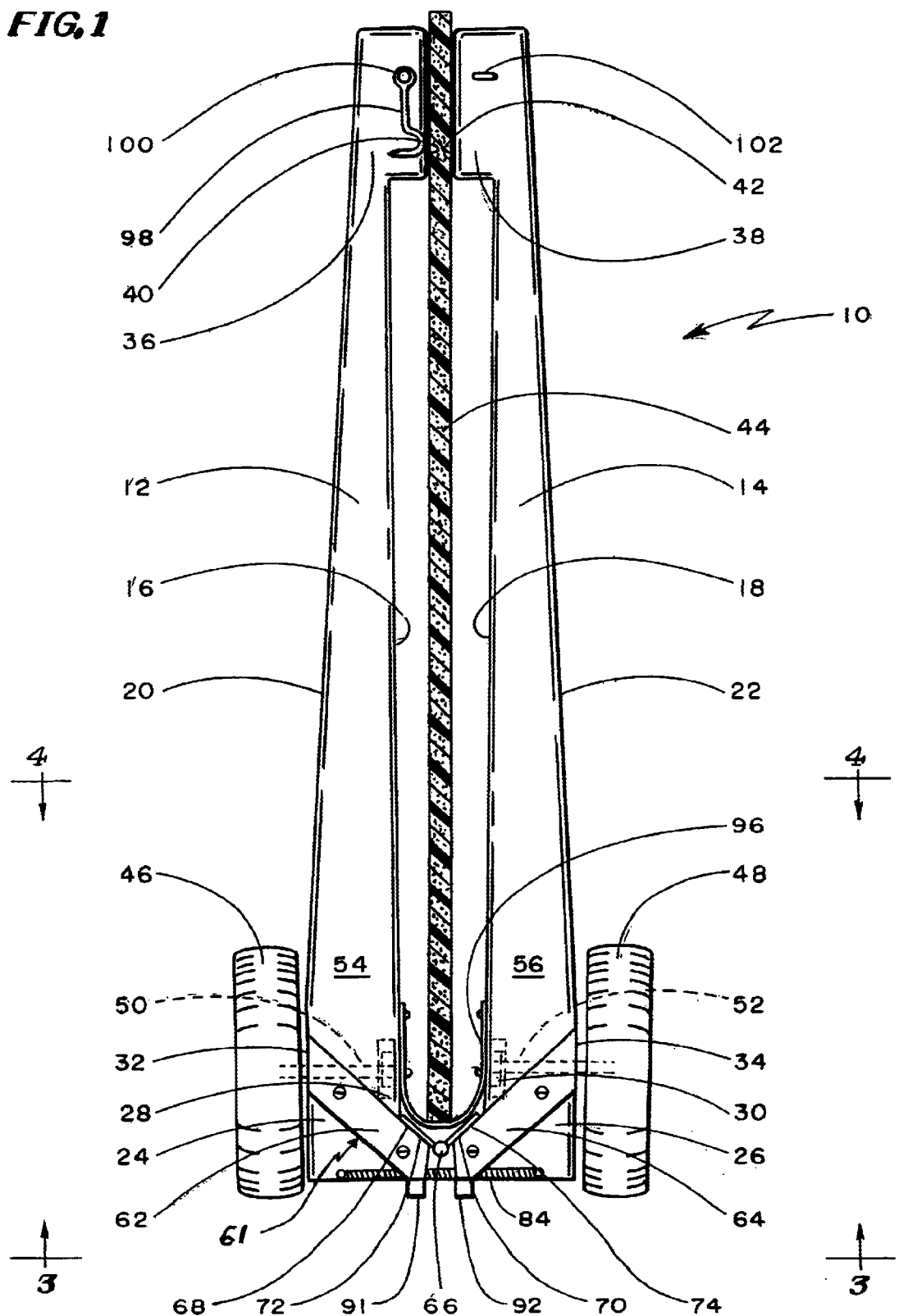
FIG. 1 is a front elevational view of the panel mover of the present invention with a panel, such as a sheet of drywall, mounted therein for being moved from one location to another location.
Figure 2:
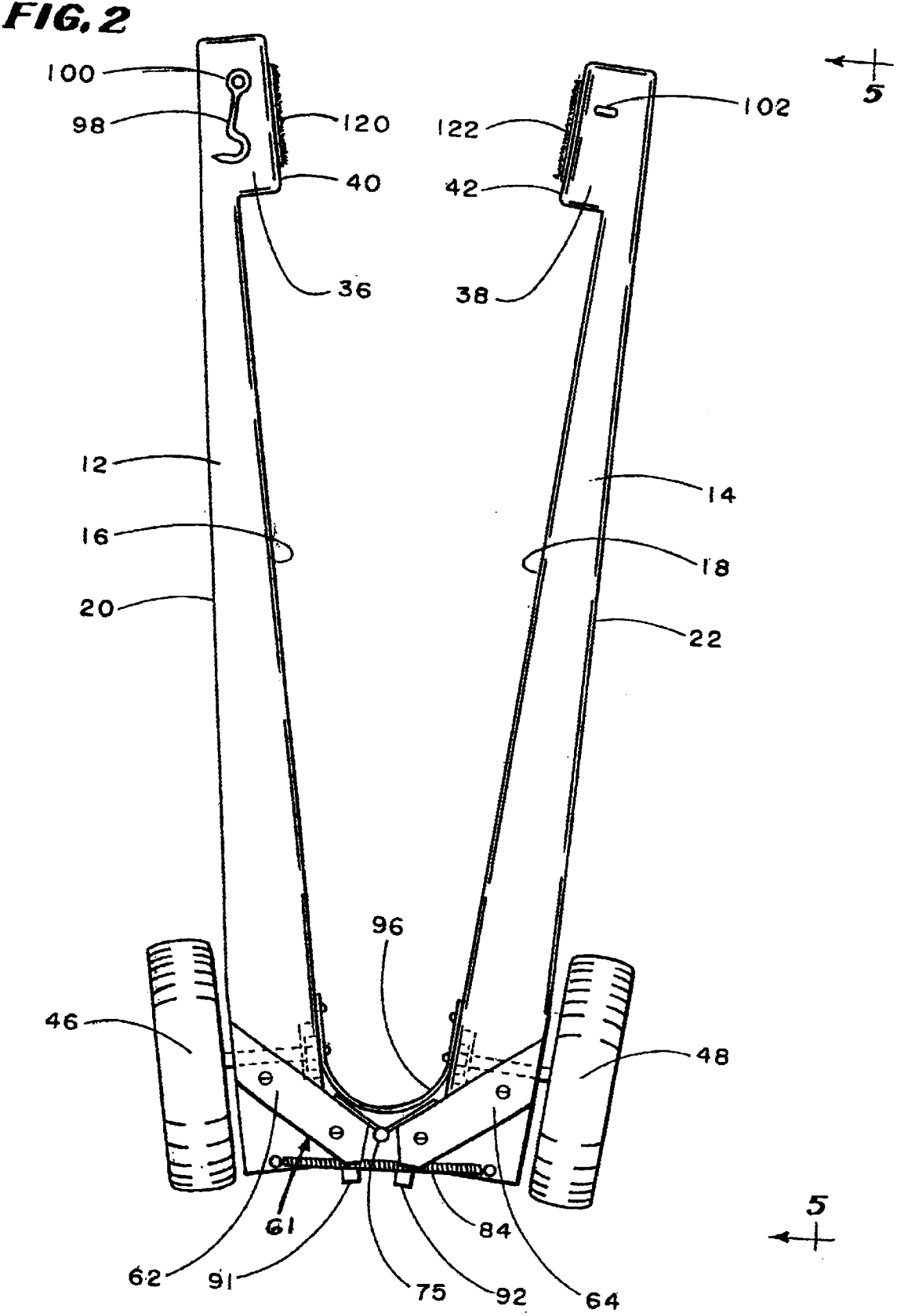
FIG. 2 is a front elevational view of the panel mover shown in FIG. 1 but with the panel removed and with upstanding arms of the panel mover extending transversely outwardly under the action of springs fixed to lowe ends of the panel mover.

Referring now to FIG. 1 in greater detail, there is illustrated therein a panel mover 10 constructed according to the teachings of the present invention. The panel mover 10 comprises first and second elongate, upstanding arms 12 and 14 each having a length of between approximately 2 feet and approximately 4 feet, and is preferably approximately 3 feet in length.

Figure 3:
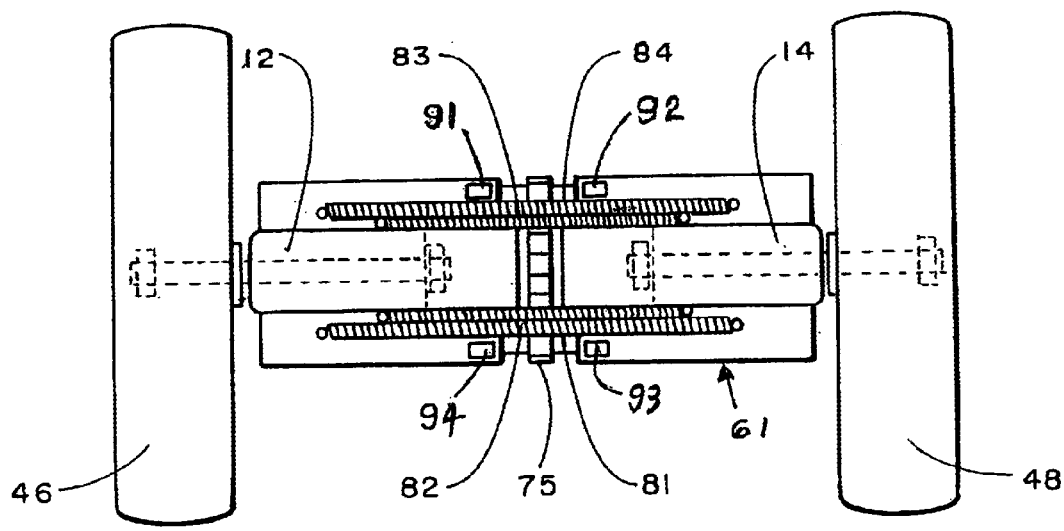
FIG. 3 is a bottom view of the panel mover shown in FIG. 1 and is taken along line 3—3 of FIG. 1.
Figure 4:
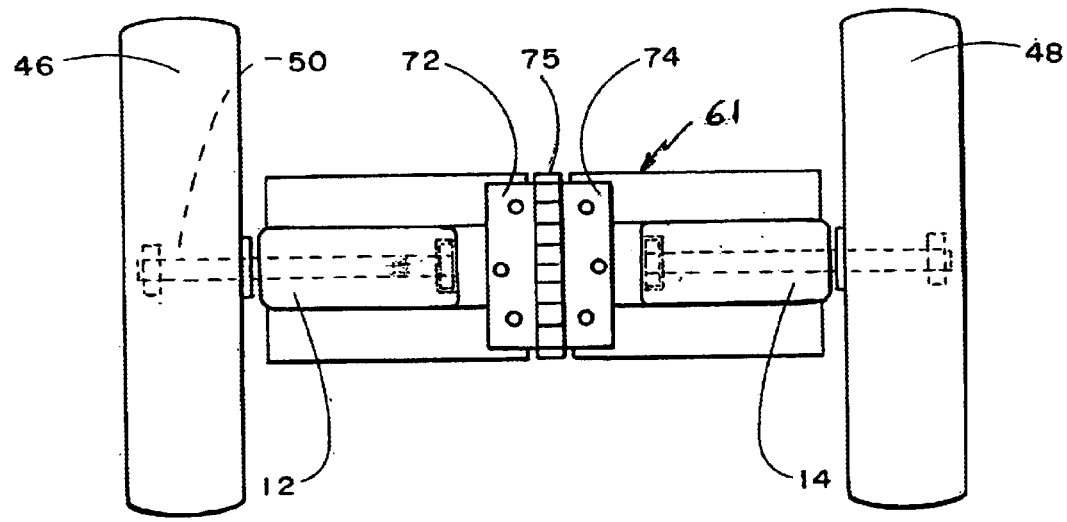
FIG. 4 is a top view of the wheel assembly of the panel mover with portions of the panel mover broken away or omitted to show the hinge assembly of the panel mover, and is taken along line 4—4 of FIG. 1.

As shown in FIGS. 3 and 4 the arms 12 and 14 each have a generally rectangular cross section.

As shown in FIG. 1, each of the arms 12 and 14 has an near planer surface 16 or 18 and an outer inclined surface 20 or 22, except for a lower end portion 24 or 26 of each arm which has parallel inner surfaces 28 and 30 and outer surfaces 32 and 34.

The upper end portion of each arm 12 and 14 has a block portion 36 or 38 which extends laterally inwardly and has an inwardly facing, generally planar panel engaging or clamping surface 40 or 42 for engaging a panel 44 which can be a sheet of standard 4×8 or 5×12 plywood or a sheet of 4×8 drywall.

Mounted to each lower end portion 24 and 26 is a wheal 46 or 48 which is mounted on a shaft 50 or 52 secured in, and extending laterally outwardly from, the outer surface 32 or 34 of one of the lower end portions 24 or 26 of one of the arms 12 or 14.

Each arm 12 and 14 has, in a direction transverse to the shaft 50 Or 2 to which it is mounted, a width less than the diameter of the wheel 46, 48 mounted on the shaft 50, 52, such that when no panel 44 is supported by the planar surface, e. g. a floor, and when a panel is placed on an edge of a, the weight of the panel 44 will cause the arms 12, 14 to rotate upwardly around wheel shafts 50, 52.

Extending laterally downwardly from each of the lower en(d portions 24, 26 and secured to the front 54, 56 and back 58, 60 (FIG. 6) sides of each arm 12 or 14 is a leg portion 60 or 62 of a bracket assembly 61.

The bracket assembly 61 comprises the two leg portions 62, 64 connected together by a hinge assembly 66 and the leg portions 62, 64 are connected to the underside of one of the lower end portions 24, 26 of the arms 12, 14. The hinge assembly 66 includes hinge plates 68 and 70 each of which is secured to an upper surface 72 or 74 of one of the legs 62, 64, as shown. Alternatively, the hinge plates 68 and 70 can have a larger lateral extent and extend across the underside of the lower end portion 24, 26 of each arm 12 and 14 and secured there to by fasteners, not shown, thereby, omitting the leg portions 62, 64 of the bracket assembly 61.

With the construction of the panel mover 10 as described above, the arms 12 and 14 can pivot toward and away from each other about the hinge assembly 66.

To facilitate positioning of a panel 44 between the arms 12 and 14, several springs 81–84 are connected at each end to one of the bottom portions 24 or 26 adjacent the front side 54, 56 and back side 58, 60 and adjacent the bottom of the panel mover 10 and beneath (through a slot in) the lower end portion of each bight portion of the U-shaped brackets 62 and 64. The springs 81–84 spring load or bias laterally outwardly, the arms 12, 14.

In one embodiment, a short projection 91–94 extends furor the bottom corner of each of the leg portions 62, 64 to form a stop member for preventing rolling of the panel mover 10 when it is in an upright position.

Additionally, in one preferred embodiment shown in FIG. 1, a panel supporting strap or webbing 96, which can be elastic and which is secured lo and between the inwardly facing surfaces 16 and 18 of the arms 12 and 14 below the axis of the shaft 50 and the shaft 52, extends downwardly in a generally U-shaped loop or trough for receiving, in an undamaged manner, a side edge of the panel 44. Note that the panel supporting structure can take other forms besides a strap or wet bing. For example panel supporting structure in the form of a trough-shaped plastic, rubber or metal part can be connected in a flexible manner between the lower end portions 24, 26.

Preferably, some mechanism is provided for holding the arms 12 and 14 together against the action of the springs 81–84. Such mechanism can take the form of a conventional hook-type latch 98 pivotably secured by an eye,let 100 to the front side 54 of the arm 12 and is adapted to be received in an eyelet 102 extending from the front surface 56 of the arm 14.

In addition or in the alterative, a hook 104 and eyelets 106 and 108 can be mounted to the backsides 58 and 60 of the arms 12 and 14 for latching the arms 12 and 14 together as shown in FIG. 6.

As a further alternative, patches 120 and 122 of hook and loop type fastening material, of the type sold under the trademark VELCRO can be attached to the inwardly facing surfaces 40 or 42.

The panel mover 10 has the unique ability of being usable by one person whereby only one person is needed to move a sheet of plasterboard, drywall or plywood from one place to another instead of the normal use of two people to carry the sheet or panel of plasterboard, drywall or plywood. In this use, the panel mover 10 is laid down flat and a long edge of a sheet of plasterboard is placed on the edge of the webbing 96. The weight of the plasterboard will then cause the arms 12 and 14 of the panel mover 10 to rotate upwardly around the wheel shifts 50 and 52 and, at the same time to tilt or pivot upwardly and inwardly about the Wheels 46 and 48 to a vertical position panel or sheet engaging position as the sheet of plasterboard or panel of plywood moves into the trough formed by the webbing 96 or engages against the V of the hinge plates 68 and 70.

Figure 7:
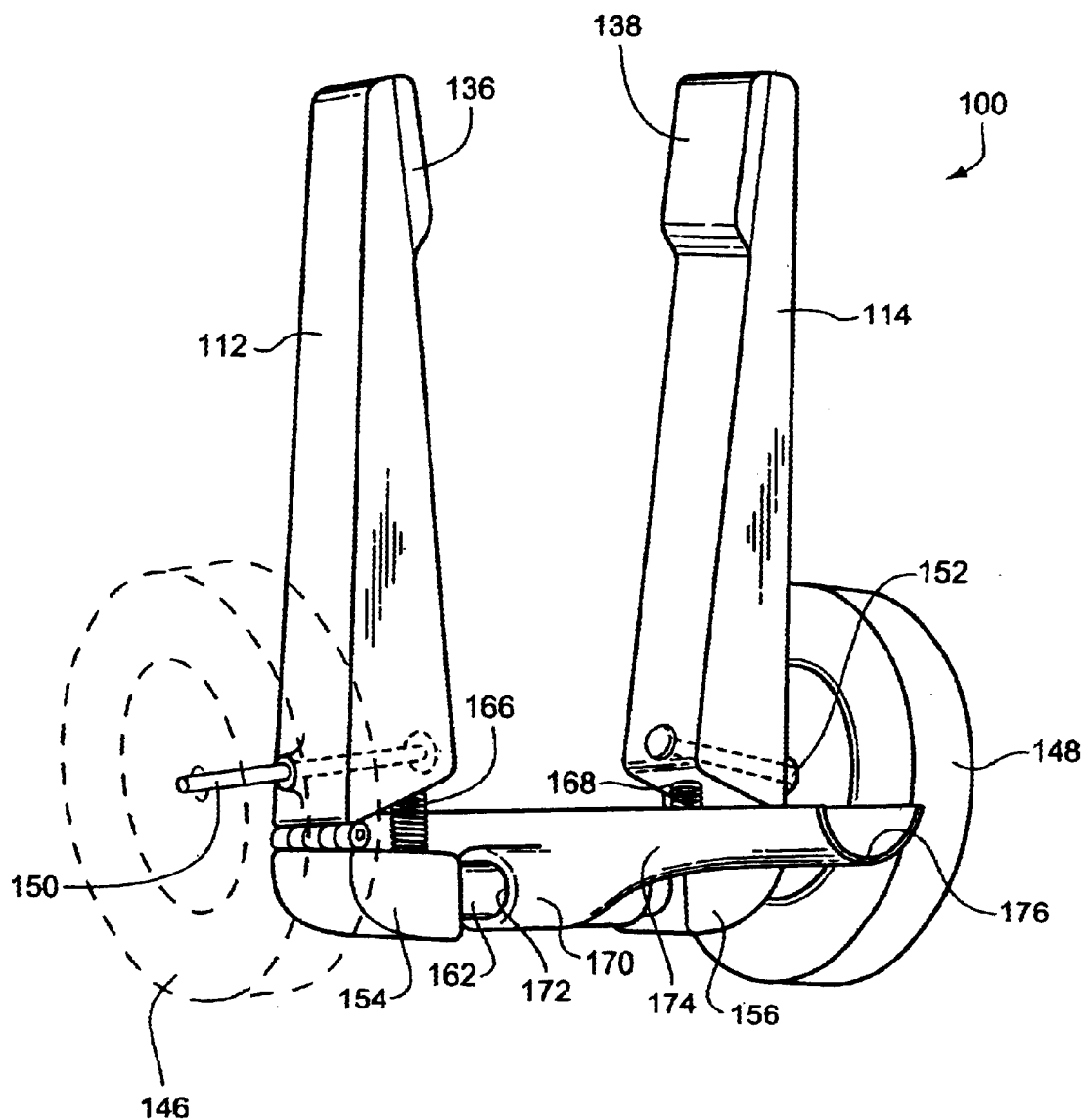
FIG. 7 is a front perspective view of another embodiment of a panel mover constructed according to the teachings of the present invention.

In FIG. 7 is illustrated another embodiment of a panel mover 100 constructed according to the teachings of the present invention. Here, the panel mover includes a pair of elongate arms 112 and 114 each having a length between approximately 4feet and approximately 6 feet, preferably approximately 3 feet in length. The upper end of 136, 138 of each arm 112,114 has an inwardly extending boss for engaging a 4×8 or 5×12 panel of plywood or a 4×8 sheet of drywall or plasterboard. A wheel 146,148 is mounted on a shaft 150, 152 extending outwardly from the lower end of each arm 112, 114. A lower block 154, 156 is hingedly mounted by a hinge assembly 158, 160 to the lower end of each arm 112, 114. A dropshaft 162 is journalled in the blocks 158, 160 and mounts a panel support member 164 which freely rotates on the dropshaft 162. A spring 166, 168 is located between each block 158, 160 and the lower end of the adjacent arm 112 or 114 to bias the arms 132, 114 laterally outwardly.

The panel support member 164 includes a lower body portion 170 having a throughbore 172 for receiving the dropshaft 162 and an upper body portion 174 which extends transversely of the throughbore 172 and generally front o rear of the panel mover 100. An upper surface 176 of the upper body portion 174 has the shape of a trough, i.e., semi-cylindrical or U-shaped. The panel support member 164 can have a length which is greater than the diameter of the wheels 146, 148.

In use, the panel mover 100 will rest on the floor with the panel support member 164 extending generally parallel to the arms 112, 114. Then a panel is placed on the panel support member and cause it to move downwardly under the weight of the panel. At the same time, the arms 112, 114 will rot ate upwardly about he wheel shafts 150 and 152. Also the weight of the panel will cause the arms to compress the springs 116, 118 and bring the upper ends 136, 188 of the arms 112, 114 into clamping engagement with the panel.

From the foregoing description, it will be apparent that the panel mover 10 or 100 of the present invention has a number of advantages, some of which have been described above and others of which are inherent in the invention. Also it will be understood that modifications can be made to the panel mover 10 or 100 described above without departing from the teachings of the present invention. Accordingly, the scope of the invention is only to be limited as necessitated by the accompanying claims.

I claim:

1. A panel mover comprising:
   first and second elongate arms each having an upper end and a lower end;
   means for hingedly or pivotally connecting the lower ends of the arms together;
   a wheel mounted to each arm on an outer side thereof at said lower end of each arm;

means between said lower ends of said arms for supporting a panel;

engaging means at said upper end of each arm for engaging the side surface of a panel positioned between said arms; and a bracket having two leg portions, each leg portion straddling and extending angularly downwardly and inwardly from a lower end portion of one of said arms and said means for hingedly and pivotally connecting said lower ends of said arms comprises first and second hinge plates interconnected by a hinge pin, each plate being fixed to an upper side of one of said leg portions.

2. The panel mover of claim 1, including one or more stop members fixed to a lower side of one of said leg portions and extending downwardly for engaging a floor surface to prevent rolling of the wheels when said panel mover is set at rest against a wall.

3. A panel mover for receiving, holding and moving a panel having a width of at least 3 feet and a length greater than 3 feet and comprising:

first and second elongate arms each having an upper end and a lower end and each having a length of approximately 3 feet;

panel support means connected between said arms at said lower ends of said arms;

a wheel mounted to each arm on one of two separate wheel shafts extending from an outer side of each arm at said lower end of each arm; each wheel having a diameter which is greater than the width of each arm in a direction transverse to an axis of said wheel and each wheel shaft being fixed to one of said arms;

a block portion connected to an inner side of each arm at the upper end of each arm and extending inwardly toward the other block portion, each block portion having an inwardly facing, generally planar surface for engaging the side surface of a panel having a width of at least 3 feet and a length over 3 feet and being positioned between said arms, whereby, when, an elongate edge of the panel is placed on said panel support means, the weight of the panel will cause each elongate arm to rotate upwardly transverse to a diameter of and about one of said wheels and pivot about the point of engagement of said one of said wheels with a supporting surface inwardly toward the panel to a panel engaging position where said planar surface of said block portion at said upper end of each arm engages the panel and a bracket having two leg portions, each leg portion extending inwardly from a lower end portion of one of said arms and hinge means for hingedly or pivotally connecting said lower ends of said arms together comprising a hinge assembly including first and second hinge plates, each hinge plate being fixed to one of said leg portions and connected together by a hinge pin, said hinge assembly also functioning as said panel support means for supporting the panel between the lower ends of the arms.

4. The panel mover of claim 3, including spring means fixed between the lower ends of each arm for spring loading or biasing said respective upper ends of said arms in a laterally outward direction away from each other.

5. The panel mover of claim 3, including latching means for latching the upper ends of said arms together when said panel mover is not holding a panel and said panel mover is not being used.

6. The panel mover of claim 5, wherein said latching means comprises first and second eyelets mounted to a front or back surface of said upper ends of said arms and a latch key mounted to one eyelet and adapted to latch with said other eyelet.

7. The panel mover of claim 5, wherein said latching means comprises first and second patches of hook and loop material each mounted on an inner facing surface of one of said upper ends of said arms.

8. A panel mover for receiving, holding and moving a panel having a width at least 3 feet and a length over 3 feet and comprising:

first and second elongate arms each having an upper end and a lower end and each having a length of approximately 3 feet;

panel support means connected between said arms at said lower ends of said arms;

a bracket having two leg portions each leg portion extending inwardly from a lower end portion of one of said arms;

means for hingedly and pivotally connecting said lower end of said arms comprising first and second hinge plates interconnected by a hinge pin and each plate being fixed to an upper side of one of said leg portions;

a wheel mounted to each arm on one of two separate wheel shafts extending from an outer side of each arm at said lower end of each arm; each wheel having a diameter which is greater than the width of each arm in a direction transverse to an axis of said wheel and each wheel shaft being fixed to one of said arms;

a block portion connected to an inner side of each arm at the upper end of each arm and extending inwardly toward the other block portion, each block portion having an inwardly facing, generally planar surface for engaging the side surface of a panel having a width of at least 3 feet and a length over 3 feet and being positioned between said arms, whereby, when, an elongate edge of the panel is placed on said panel support means, the weight of the panel will cause each elongate arm to rotate upwardly transverse to a diameter of and about one of said wheels and pivot about the point of engagement of said one of said wheels with a supporting surface inwardly toward the panel to a panel engaging position where said planar surface of said block portion at said upper end of each arm engages the panel and said panel support means for supporting the panel between said arms comprising a strap or webbing fixed at each end to a lower inwardly facing surface at said lower end of one of said arms.

9. The panel mover of claim 8, including spring means fixed between the lower ends of each arm for spring loading or biasing said respective upper ends of said arms in a laterally outward direction away from each other.

10. A panel mover for receiving, holding and moving a panel having a width of at least 3 feet and a length over 3 feet and comprising:

first and second elongate arms each having an upper end and a lower end and each having a length of approximately 3 feet;

panel support means connected between said arms at said lower ends of said arms;

a wheel mounted to each arm on one of two separate wheel shafts extending from an outer side of each arm at said lower end of each arm; each wheel having a diameter which is greater than the width of each arm in a direction transverse to an axis of said wheel and each wheel shaft being fixed to one of said arms;

a block portion connected to an inner side of each arm at the upper end of each arm and extending inwardly toward the other block portion, each block portion having an inwardly facing, generally planar surface only at said upper end of each arm at a location where said planar surface of said block portion will engage the side surface of the panel positioned between said arms, whereby, when, an elongate edge of the panel is placed on said panel support means, the weight of the panel will cause each elongate arm to rotate upwardly transverse to a diameter of and about one of said wheels and pivot about the point of engagement of said one of said wheels with a supporting surface inwardly toward the panel to a panel engaging position where said planar surface of said block portion at said upper end of each arm engages the panel;

a block beneath each arm;

means for pivotally connecting each block to said lower end of each arm;

a dropshaft extending between and journaled to said blocks; and, said panel support means being rotatably mounted on said dropshaft.

11. The panel mover of claim 10, including spring means fixed to the lower end of each arm and said block beneath each arm for spring loading or biasing said respective upper ends of said arms in a laterally outward direction away from each other.

12. A panel having a width of at least 3 feet and a length greater than 3 feet and a panel mover for receiving, holding and moving said panel, said panel mover comprising:

first and second elongate arms each having an upper end and a lower end and each having a length of approximately 3 feet;

panel support means connected between said arms at said lower ends of said arms;

a wheel mounted to each arm on one of two separate wheel shafts extending from an outer side of each arm at said lower end of each arm; each wheel having a diameter which is greater than the width of each arm in a direction transverse to an axis of said wheel and each wheel shaft being fixed to one of said arms;

a block portion connected to an inner side of each arm at the upper end of each arm and extending inwardly toward the other block portion, each block portion having an inwardly facing, generally planar surface located only at said upper end of each arm at a location where said planar surface of said block portion will engage the side surface of said panel positioned between said arms, whereby, when, an elongate edge of said panel is placed on said panel support means, the weight of said panel will cause each elongate arm to rotate upwardly transverse to a diameter of and about one of said wheels and pivot about the point of engagement of said one of said wheels with a supporting surface inwardly toward said panel to a panel engaging position where said planar surface of said block portion at said upper end of each arm engages said panel and a bracket having two leg portions, each leg portion extending inwardly from a lower end portion of one of said arms and means for hingedly or pivotally connecting said lower ends of said arms together comprising a hinge assembly including first and second hinge plates, each hinge plate being fixed to an upper side of one of said leg portions and connected together by a hinge pin, said hinge assembly also functioning as said panel support means for supporting said panel between the lower ends of the arms; and, spring means fixed between the lower ends of each arm for spring loading or biasing said respective upper ends of said arms in a laterally outward direction away from each other.

* * * * *